US012211045B2

(12) United States Patent
Otero et al.

(10) Patent No.: US 12,211,045 B2
(45) Date of Patent: Jan. 28, 2025

(54) SYSTEM, METHOD, AND COMPUTER PROGRAM PRODUCT FOR VIRTUAL ACCOUNTS BASED ON BIOMETRIC MEASUREMENTS

(71) Applicant: Visa International Service Association, San Francisco, CA (US)

(72) Inventors: Cesar M. Otero, Boulder Creek, CA (US); Murali Krishnan Sreenivasan, Pleasanton, CA (US); Preska Sharma, Urbana, IL (US); Libby Annie Kurien, Santa Clara, CA (US)

(73) Assignee: Visa International Service Association, San Francisco, CA (US)

( * ) Notice: Subject to any disclaimer, the term of this patent is extended or adjusted under 35 U.S.C. 154(b) by 309 days.

(21) Appl. No.: 17/430,031

(22) PCT Filed: Feb. 28, 2019

(86) PCT No.: PCT/US2019/019945
§ 371 (c)(1),
(2) Date: Aug. 11, 2021

(87) PCT Pub. No.: WO2020/176092
PCT Pub. Date: Sep. 3, 2020

(65) Prior Publication Data
US 2022/0138759 A1 May 5, 2022

(51) Int. Cl.
*G06Q 20/40* (2012.01)
*G06Q 20/28* (2012.01)
*G06V 40/16* (2022.01)

(52) U.S. Cl.
CPC ....... *G06Q 20/40145* (2013.01); *G06Q 20/28* (2013.01); *G06Q 20/405* (2013.01); *G06V 40/16* (2022.01)

(58) Field of Classification Search
CPC . G06Q 20/40145; G06Q 20/28; G06Q 20/405
(Continued)

(56) References Cited

U.S. PATENT DOCUMENTS 10,460,312 B1 * 10/2019 Kurani ............... G06Q 20/32
11,562,362 B1 * 1/2023 Chang ............... G06Q 20/10
(Continued)

FOREIGN PATENT DOCUMENTS

KR       20170141930 A       12/2017

OTHER PUBLICATIONS

Knight, "Paying with Your Face Face-detecting systems in China now authorize payments, provide access to facilities, and track down criminals. Will other countries follow?", 2017, 8 pages.
(Continued)

*Primary Examiner* — Courtney P Jones
(74) *Attorney, Agent, or Firm* — The Webb Law Firm

(57) ABSTRACT

Provided is a method for providing a virtual account based on a biometric measurement, the method includes receiving biometric data associated with a biometric measurement of an individual, generating an virtual account of the individual based on receiving the biometric data associated with the biometric measurement of the individual, provisioning access to the virtual account of the individual based on the biometric measurement of the individual, and sending a message to a user device based on generating the virtual account associated with the individual, where the notification message includes an indication associated with the virtual account. A system and computer program product are also disclosed.

16 Claims, 9 Drawing Sheets

(58) Field of Classification Search
USPC .......................................................... 705/75
See application file for complete search history.

(56) References Cited

U.S. PATENT DOCUMENTS

| | | | |
|---|---|---|---|
| 2015/0142657 A1* | 5/2015 | Sagastiverza | G06Q 20/351 |
| | | | 705/44 |
| 2017/0255923 A1 | 9/2017 | Dieter et al. | |
| 2017/0372428 A1* | 12/2017 | Shakkarwar | G06Q 40/06 |
| 2018/0139203 A1 | 5/2018 | Dolan et al. | |
| 2020/0058032 A1* | 2/2020 | Lad | G06V 40/1365 |
| 2020/0067917 A1* | 2/2020 | McBain | G06F 21/35 |
| 2020/0118205 A1* | 4/2020 | Bloy | G06Q 20/3223 |
| 2020/0134605 A1* | 4/2020 | Grant | G06Q 30/0215 |
| 2020/0410500 A1* | 12/2020 | Dorogusker | G06Q 20/202 |
| 2021/0272125 A1* | 9/2021 | Kopf | G06Q 20/38215 |

OTHER PUBLICATIONS

Perez, "Bravo's App Makes It Easy to Tip When You Don't Have Cash", 2015, 14 pages.

* cited by examiner

SYSTEM, METHOD, AND COMPUTER PROGRAM PRODUCT FOR VIRTUAL ACCOUNTS BASED ON BIOMETRIC MEASUREMENTS

CROSS-REFERENCE TO RELATED APPLICATION

This application is the United States national phase of International Application No. PCT/US2019/019945 filed Feb. 28, 2019, the disclosure of which is hereby incorporated by reference in its entirety.

BACKGROUND

1. Technical Field

This disclosure relates generally to systems, devices, products, apparatus, and/or methods that provide and use virtual accounts and, in one particular embodiment, to a system, device, product, apparatus, and method for providing a virtual account based on a biometric measurement.

2. Technical Considerations

A gift card (e.g., a gift certificate, a gift voucher, a gift token, and/or the like) may include a card (e.g., a physical card) issued by an entity, such as a merchant (e.g., a retailer) or a financial institution (e.g., a bank), that is provided to a recipient (e.g., an individual), where the card is associated with an account having a prepaid amount of funds and that can be used as an alternative to cash for a payment transaction involving a merchant. In some instances, a gift card may be given out by a merchant as part of a promotion strategy, to entice the recipient to conduct business with the merchant. In some instances, a gift card may be redeemable only during a payment transaction at a specified merchant location and may not be used to receive cash. Additionally, the gift card may be subject to an expiration date, which is a time at which the remaining funds associated with the gift card are received by the entity that issued the gift card. Further, the gift card may be subject to fees that are amounts deducted from the account associated with the gift card by the entity that issued the gift card based on a time period from issuance of the gift card, based on a number of payment transactions involving the gift card, and/or the like.

In some instances, a gift card may include a virtual gift card (e.g., a mobile gift card, an electronic gift card, an e-gift card, and/or the like) that can be provided to a recipient electronically. The virtual gift card may be provided to the recipient via a communication to a mobile device of the recipient, such as via an email and/or a short message service (SMS). In some instances, a donor may provide a gift card or a virtual gift card to an individual as a donation (e.g., a charitable gift) to assist the individual.

However, a donor may desire to provide a donation, as a gift card, to the individual and still retain control over how the individual may use the funds that constitute the donation. For example, the donor may desire to place a restriction on a merchant at which the individual may conduct a payment transaction involving funds from the gift card, an amount of a payment transaction involving funds from the gift card, a time interval during which the individual may conduct a payment transaction involving funds from the gift card, and/or the like.

In addition, to access to the funds associated with a gift card or a virtual gift card, an individual may need only to have the account identifier of the account associated with a gift card or a virtual gift card. However, the account identifier of the account associated with a gift card or a virtual gift card may be lost or stolen. Accordingly, a donor may desire to provide the donation to the individual in which access to the funds associated with the donation is more secure than access to the funds associated with a gift card or a virtual gift card.

SUMMARY

Accordingly, improved systems, devices, products, apparatus, and/or methods for providing and/or accessing a virtual account of an individual based on biometric measurement are disclosed.

According to non-limiting embodiments or aspects, provided is a computer-implemented method for providing a virtual account of an individual based on biometric measurement. The computer-implemented method comprises receiving, with at least one processor, biometric data associated with a biometric measurement of an individual; generating, with at least one processor, an virtual account of the individual based on receiving the biometric data associated with the biometric measurement of the individual; provisioning, with at least one processor, access to the virtual account of the individual based on the biometric measurement of the individual; and sending, with at least one processor, a notification message to a user device based on generating the virtual account associated with the individual, wherein the notification message includes an indication that the virtual account of the individual has been generated.

According to non-limiting embodiments or aspects, provided is a system for providing a virtual account of an individual based on biometric measurement. The system comprises at least one processor programmed or configured to: receive biometric data associated with a biometric measurement of an individual from a user device of a user; generate a virtual account of the individual based on receiving the biometric data associated with the biometric measurement of the individual; provision access to the virtual account of the individual based on the biometric measurement of the individual; and send a message to the user device based on generating the virtual account associated with the individual, wherein the message includes an indication associated with the virtual account of the individual.

According to non-limiting embodiments or aspects, provided is a computer program product for providing a virtual account of an individual based on biometric measurement. The computer program product comprises at least one non-transitory computer-readable medium including one or more instructions that, when executed by at least one processor, cause the at least one processor to receive biometric data associated with a biometric measurement of an individual from a first user device of a user; generate a virtual account of the individual based on receiving the biometric data associated with the biometric measurement of the individual; provision access to the virtual account of the individual based on the biometric measurement of the individual; and send a message to a second user device of the individual based on generating the virtual account associated with the individual, wherein the message includes an indication associated with the virtual account of the individual.

Further embodiments or aspects are set forth in the following numbered clauses:

Clause 1: A computer-implemented method for providing a virtual account of an individual based on biometric measurement, the computer-implemented method comprising: receiving, with at least one processor, biometric data associated with a biometric measurement of an individual; generating, with at least one processor, an virtual account of the individual based on receiving the biometric data associated with the biometric measurement of the individual; provisioning, with at least one processor, access to the virtual account of the individual based on the biometric measurement of the individual; and sending, with at least one processor, a notification message to a user device based on generating the virtual account associated with the individual, wherein the notification message includes an indication that the virtual account of the individual has been generated.

Clause 2: The computer-implemented method of clause 1, wherein generating the virtual account of the individual comprises: generating the virtual account associated with the individual as a virtual prepaid account controlled and operated by a transaction service provider or an issuer institution.

Clause 3: The computer-implemented method of clauses 1 or 2, wherein generating the virtual account of the individual comprises: determining an amount of electronic funds for the virtual account based on data associated with an amount of electronic funds for the account received from the user device; determining a restriction on use of electronic funds in the virtual account based on data associated with the restriction on use of electronic funds in the account received from the user device; and storing the restriction on use of electronic funds in the virtual account with an account identifier of the virtual account of the individual.

Clause 4: The computer-implemented method of any of clauses 1-3, wherein the notification message is a first notification message, the user device is a first user device of a user, and the method further comprising: sending a second notification message to a second user device of the individual based on generating the account associated with the individual, wherein the second notification message includes an indication that the account of the individual has been generated and data associated with an amount of electronic funds for the virtual account of the individual.

Clause 5: The computer-implemented method of any of clauses 1-4, wherein receiving the biometric data associated with the biometric measurement of the individual comprises: receiving image data associated with an image of the individual, wherein the image of the individual is captured by an image capture device associated with the user device.

Clause 6: The computer-implemented method of any of clauses 1-5, wherein the biometric data associated with the biometric measurement of the individual comprises hashed biometric data associated with the biometric measurement, wherein the hashed biometric data associated with the biometric measurement comprises an output of a hash algorithm into which biometric data associated with the individual captured by the user device is inputted, and wherein receiving the biometric data associated with the biometric identification parameter of the individual comprises: receiving the hashed biometric data associated with the biometric measurement; and wherein generating the virtual account of the individual comprises: storing the hashed biometric data associated with the biometric measurement with an account identifier of the virtual account of the individual.

Clause 7: The computer-implemented method of any of clauses 1-6, further comprising: transferring an amount of electronic funds to an account of a user that sponsored the virtual account of the individual based on an expiration of an expiration time period after generating the virtual account of the individual.

Clause 8: The computer-implemented method of any of clauses 1-7, wherein the biometric measurement is a first biometric measurement, the method further comprising: receiving biometric data associated with a second biometric measurement of the individual; authenticating an identity of the individual based on the biometric data associated with the second biometric measurement of the individual; determining data associated with the virtual account of the individual based on authenticating the identity of the individual; and sending the data associated with the virtual account of the individual.

Clause 9: The computer-implemented method of any of clauses 1-8, wherein authenticating the identity of the individual comprises: comparing the second biometric measurement of the individual with a biometric identification parameter of the individual; and determining whether the second biometric measurement of the individual corresponds to the biometric identification parameter of the individual; authenticating the identity of the individual based on determining that the second biometric measurement of the individual corresponds to the biometric identification parameter of the individual.

Clause 10: The computer-implemented method of any of clauses 1-9, wherein the biometric measurement is a first biometric measurement, the method further comprising: causing a document to be generated based on authenticating an identity of the individual based on biometric data associated with a second biometric measurement of the individual, wherein the document includes an account identifier of the virtual account of the individual.

Clause 11: A system for providing a virtual account based on a biometric measurement, the system comprising: at least one processor programmed or configured to: receive biometric data associated with a biometric measurement of an individual from a user device of a user; generate a virtual account of the individual based on receiving the biometric data associated with the biometric measurement of the individual; provision access to the virtual account of the individual based on the biometric measurement of the individual; and send a message to the user device based on generating the virtual account associated with the individual, wherein the message includes an indication associated with the virtual account of the individual.

Clause 12: The system of clause 11, wherein, when generating wherein generating the virtual account of the individual, the at least one processor is programmed or configured to: determine an amount of electronic funds for the virtual account based on data associated with an amount of electronic funds for the account received from the user device; determine a restriction on use of electronic funds in the virtual account based on data associated with the restriction on use of electronic funds in the account received from the user device; and store the restriction on use of electronic funds in the virtual account with an account identifier of the virtual account of the individual.

Clause 13: The system of clauses 11 or 12, wherein the message is a first message, the user device of the user is a first user device of the user, and the at least one processor is further programmed or configured to: send a second message to a second user device of the individual based on generating the account associated with the individual, wherein the second notification message includes an indication that the account of the individual has been generated and data associated with an amount of electronic funds for the virtual account of the individual.

Clause 14: The system of any of clauses 11-13, wherein, when receiving the biometric data associated with the biometric measurement of the individual, the at least one processor is programmed or configured to: receive image data associated with an image of the individual, wherein the image of the individual is captured by an image capture device associated with the user device of the user.

Clause 15: The system of any of clauses 11-14, wherein the biometric measurement is a first biometric measurement, and the at least one processed is further programmed or configured to: receive biometric data associated with a second biometric measurement of the individual; authenticate an identity of the individual based on the biometric data associated with the second biometric measurement of the individual; determine data associated with the virtual account of the individual based on authenticating the identity of the individual; and send the data associated with the virtual account of the individual.

Clause 16: A computer program product for providing a virtual account based on a biometric measurement, the computer program product comprising at least one non-transitory computer-readable medium including one or more instructions that, when executed by at least one processor, cause the at least one processor to: receive biometric data associated with a biometric measurement of an individual from a first user device of a user; generate a virtual account of the individual based on receiving the biometric data associated with the biometric measurement of the individual; provision access to the virtual account of the individual based on the biometric measurement of the individual; and send a message to a second user device of the individual based on generating the virtual account associated with the individual, wherein the message includes an indication associated with the virtual account of the individual.

Clause 17: The computer program product of clause 16, wherein the one or more instructions that cause the at least one processor to generate the virtual account of the individual, cause the at least one processor to: determine an amount of electronic funds for the virtual account based on data associated with an amount of electronic funds for the account received from the user device; determine a restriction on use of electronic funds in the virtual account based on data associated with the restriction on use of electronic funds in the account received from the user device; and store the restriction on use of electronic funds in the virtual account with an account identifier of the virtual account of the individual.

Clause 18: The computer program product of clauses 16 or 17, wherein the one or more instructions that cause the at least one processor to generate the virtual account of the individual, cause the at least one processor to: generate the virtual account associated with the individual as a virtual prepaid account controlled and operated by a transaction service provider or an issuer institution.

Clause 19: The computer program product of any of clauses 16-18, wherein the one or more instructions further cause the at least one processor to: transfer an amount of electronic funds to an account of a user that sponsored the virtual account of the individual based on an expiration of an expiration time period after generating the virtual account of the individual.

Clause 20: The computer program product of any of clauses 16-19, wherein the biometric measurement is a first biometric measurement, and wherein the one or more instructions further cause the at least one processor to: receive biometric data associated with a second biometric measurement of the individual; authenticate an identity of the individual based on the biometric data associated with the second biometric measurement of the individual; determine data associated with the virtual account of the individual based on authenticating the identity of the individual.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
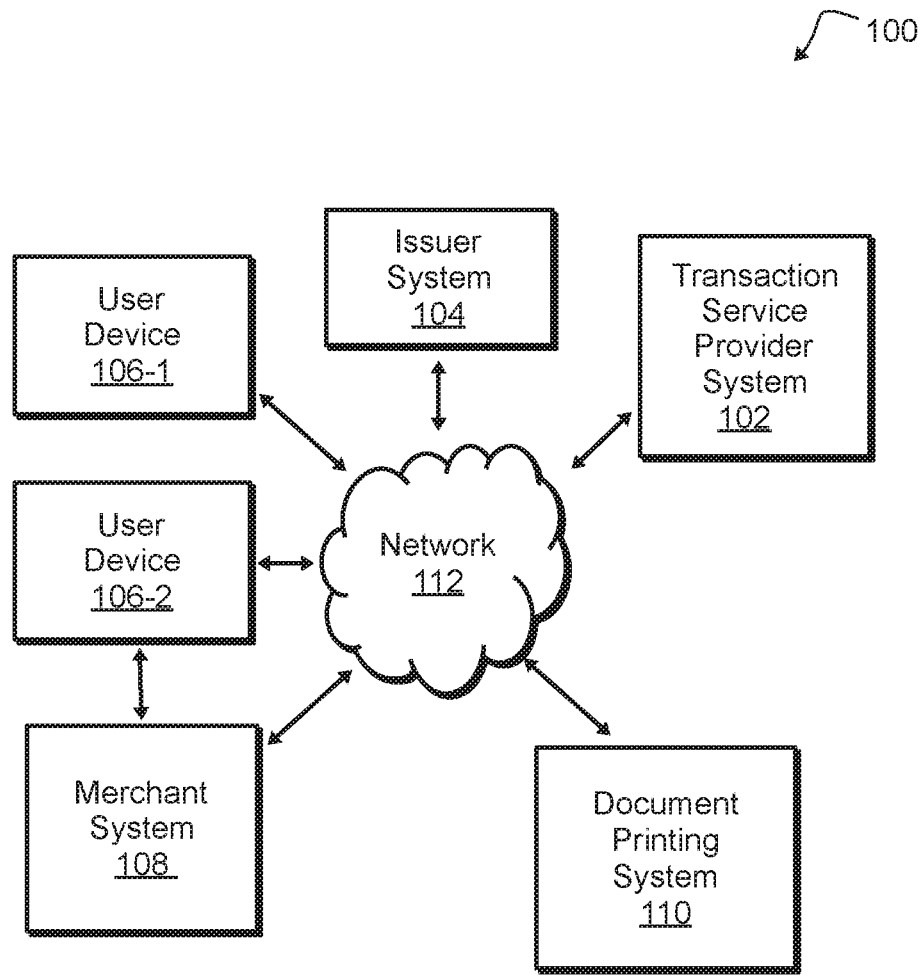
FIG. 1 is a diagram of non-limiting embodiments or aspects of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one."

Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like), to be in communication with another unit, means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In non-limiting embodiments or aspects, a message may refer to a network packet (e.g., a data packet and/or the like) that includes data.

As used herein, the terms "issuer institution," "payment device issuer," "issuer," or "issuer bank" may refer to one or more entities that provide one or more accounts to a user (e.g., customer, consumer, and/or the like) for conducting transactions (e.g., payment transactions), such as initiating credit card payment transactions and/or debit card payment transactions. For example, an issuer institution may provide an account identifier, such as a primary account number (PAN), to a user that uniquely identifies one or more accounts associated with that user. In non-limiting embodiments or aspects, an issuer institution may be associated with a bank identification number (BIN) that uniquely identifies the issuer institution. As used herein "issuer system" may refer to one or more computer systems operated by or on behalf of an issuer institution, such as a server computer executing one or more software applications. For example, an issuer system may include one or more authorization servers for authorizing a payment transaction.

As used herein, the term "account identifier" may refer to one or more types of identifiers associated with a user account (e.g., an account identifier, a PAN, a card number, a payment card number, a token, and/or the like). In non-limiting embodiments or aspects, an issuer institution may provide an account identifier (e.g., a PAN, a token, and/or the like) to a user that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In non-limiting embodiments or aspects, the account identifier may be an original account identifier, where the original account identifier was provided to a user at the creation of the account associated with the account identifier. In non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In non-limiting embodiments or aspects, an original account identifier, such as a PAN, may be associated with a plurality of tokens for different individuals or purposes. In non-limiting embodiments or aspects, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "POS system" may refer to one or more computers and/or peripheral devices used by a merchant to conduct a transaction. For example, a POS system may include one or more POS devices, and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in non-limiting embodiments or aspects, may be operated by or on behalf of a transaction service provider.

As used herein, the terms "client" and "client device" may refer to one or more computing devices, such as processors, storage devices, and/or similar computer components, that access a service made available by a server. In non-limiting embodiments or aspects, a "client device" may refer to one or more devices that facilitate payment transactions, such as POS devices and/or POS systems used by a merchant. In non-limiting embodiments or aspects, a client device may be any electronic device configured to communicate with one or more networks and/or initiate or facilitate payment transactions such as, but not limited to, one or more desktop computers, one or more portable computers (e.g., tablet computers), one or more mobile devices (e.g., cellular phones, smartphones, personal digital assistants (PDAs), wearable devices, such as watches, glasses, lenses, and/or clothing, and/or the like), and/or other like devices. Moreover, a "client" may also refer to an entity, such as a merchant, that owns, utilizes, and/or operates a client device for initiating transactions with a transaction service provider.

As used herein, the term "server" may refer to one or more computing devices, such as processors, storage devices, and/or similar computer components, that communicate with client devices and/or other computing devices over a network, such as the Internet or private networks, and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, devices, products, apparatus, and/or methods for providing and/or accessing a virtual account based on a biometric measurement. Non-limiting embodiments of the present disclosure allow a donor (e.g., a sponsor) provide a virtual account to an individual and retain control over how the individual may use the electronic funds of the virtual account. In this way, the donor may place a restriction associated with use of the virtual account and/or provide a time period, upon the expiration of which, the electronic funds of the virtual account are returned to the donor.

In addition, to access to the electronic funds associated with the virtual account, it is not necessary that the individual carry an account identifier of the virtual account. In this way, the individual may be able to access the virtual account based on a biometric measurement of the individual.

Furthermore, by providing access to the virtual account based on the biometric measurement of the individual, the virtual account is more secure than access to the funds associated with a gift card or a virtual gift card that requires an individual to carry a physical card or account identifier of an account associated with the gift card or virtual gift card. Additionally, by providing access to the virtual account based on the biometric measurement of the individual, the individual does not need to have a bank account or other individual account in order to be able to use the virtual account.

Referring now to FIG. 1, FIG. 1 is a diagram of an example environment 100 in which devices, systems, and/or methods, described herein, may be implemented. As shown in FIG. 1, environment 100 includes transaction service provider system 102, issuer system 104, one or more user devices 106-1 and 106-2 (collectively referred to as "user devices 106"), merchant system 108, document printing system 110, and network 112. Transaction service provider system 102, issuer system 104, user device 106-1, user device 106-2, merchant system 108, and/or document printing system 110 may interconnect (e.g., establish a connection to communicate) via wired connections, wireless connections, or a combination of wired and wireless connections.

Transaction service provider system 102 may include one or more devices capable of receiving information from issuer system 104, user devices 106, merchant system 108, and/or document printing system 110 via network 112 and/or sending information to issuer system 104, user devices 106, merchant system 108, and/or document printing system 110 via network 112. For example, transaction service provider system 102 may include a computing device, such as a server (e.g., a transaction processing server), a group of servers, and/or other like devices. In non-limiting embodiments or aspects, transaction service provider system 102 may be associated with transaction service provider as described herein. In non-limiting embodiments or aspects, transaction service provider system 102 may be in communication with a data storage device, which may be local or remote to the transaction service provider system 102. In non-limiting embodiments or aspects, transaction service provider system 102 may be capable of receiving information from, storing information in, sending information to, or searching information stored in the data storage device.

Issuer system 104 may include one or more devices capable of receiving information from transaction service provider system 102, user devices 106, merchant system 108, and/or document printing system 110 via network 112 and/or sending information to transaction service provider system 102, user devices 106, merchant system 108, and/or document printing system 110 via network 112. For example, issuer system 104 may include a computing device, such as a server, a group of servers, and/or other like devices. In non-limiting embodiments or aspects, issuer system 104 may be associated with an issuer institution as described herein. For example, issuer system 104 may be associated with an issuer institution that issued a credit account, debit account, credit card, debit card, and/or the like to a user of user device 106-1.

User device 106-1 or user device 106-2 may include one or more devices capable of receiving information from transaction service provider system 102, issuer system 104, merchant system 108, and/or document printing system 110 via network 112 and/or sending information to transaction service provider system 102, issuer system 104, merchant system 108, and/or document printing system 110 via network 112. For example, user device 106-1 or user device 106-2 may include a client device and/or the like. Additionally or alternatively, user device 106-1 or user device 106-2 may include one or more devices capable of capturing, receiving, and/or sending biometric data associated with a biometric measurement of an individual. For example, user device 106-1 or user device 106-2 may include a biometric reader (e.g., a fingerprint reader, an iris recognition system, a personal signature verification system, and/or the like), an image capture device, a sound recording device, and/or other like devices. In non-limiting embodiments or aspects, user device 106-1 or user device 106-2 may or may not be capable of receiving information (e.g., from merchant system 108) via a short range wireless communication connection (e.g., an NFC communication connection, an RFID communication connection, a Bluetooth® communication connection, and/or the like), and/or sending information (e.g., to merchant system 108) via a short range wireless communication connection. In non-limiting embodiments or aspects, user device 106-1 may be associated with a first entity (e.g., a first user, a first individual, a first person, and/or the like) and user device 106-2 may be associated with a second entity (e.g., a second user, a second individual, a second person, and/or the like).

Merchant system 108 may include one or more devices capable of receiving information from transaction service provider system 102, issuer system 104, user devices 106, and/or document printing system 110 via network 112 and/or sending information to transaction service provider system 102, issuer system 104, user devices 106, and/or document printing system 110 via network 112. For example, merchant system 108 may include a computing device, such as a server, a group of servers, a client device, a group of client devices, and/or other like devices. Additionally or alternatively, merchant system 108 may include one or more devices capable of capturing, receiving, and/or sending biometric data associated with a biometric measurement of an individual. For example, merchant system 108 may include a biometric reader (e.g., a fingerprint reader, an iris recognition device, a personal signature verification device, and/or the like), an image capture device, a sound recording device, and/or other like devices. In non-limiting embodiments or aspects, merchant system 108 may be associated with a merchant as described herein. In non-limiting embodiments or aspects, merchant system 108 may include one or more user devices 106. For example, merchant system 108 may include a user device (e.g., user device 106-1, user device 106-2, and/or the like) that allows a merchant to communicate information to transaction service provider system 102. In non-limiting embodiments or aspects, merchant system 108 may include one or more devices, such as computers, computer systems, and/or peripheral devices capable of being used by a merchant to conduct a payment transaction with a user. For example, merchant system 108 may include a POS device and/or a POS system.

Document printing system 110 may include one or more devices capable of receiving information from transaction service provider system 102, issuer system 104, user devices 106, and/or merchant system 108 via network 112 and/or sending information to transaction service provider system 102, issuer system 104, user devices 106, and/or merchant system 108 via network 112. For example, document printing system 110 may include a computing device, such as a server, a group of servers, a client device, a group of client devices, and/or other like devices. Additionally or alternatively, document printing system 110 may include a printing device, such as an electronic printer (e.g., a laser printer, an inkjet printer, a thermal printer, and/or the like), a credit card printer, an identification card printer, and/or the like. In non-limiting embodiments or aspects, document printing system 110 may be capable of generating a document (e.g., a physical document, a payment device, and/or the like) associated with a virtual account. For example, document printing system 110 may be capable of generating a document that includes an account identifier of a virtual account Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
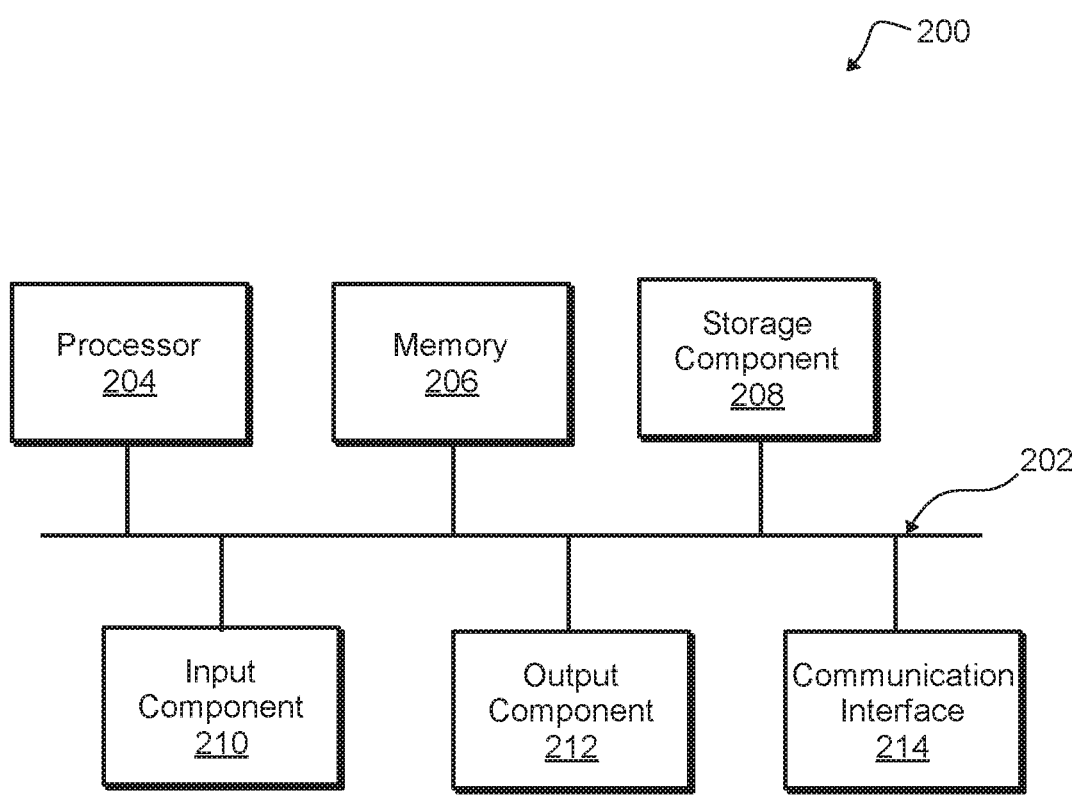
FIG. 2 is a diagram of non-limiting embodiments or aspects of components of one or more devices of FIG. 1.

Referring now to FIG. 2, FIG. 2 is a diagram of example components of a device 200. Device 200 may correspond to one or more devices of transaction service provider system 102, one or more devices of issuer system 104, user device 106-1, user device 106-2, one or more devices of merchant system 108, and/or one or more devices of document printing system 110. In non-limiting embodiments or aspects, transaction service provider system 102, issuer system 104, user device 106-1, user device 106-2, merchant system 108, and/or document printing system 110 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include a random access memory (RAM), a read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
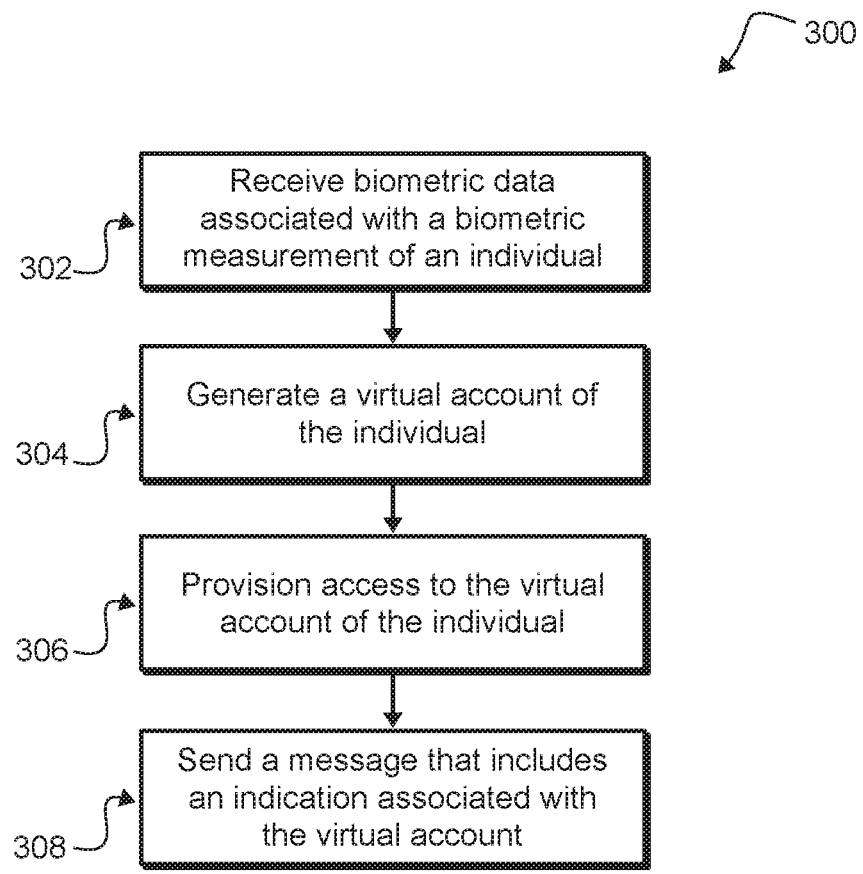
FIG. 3 is a flowchart of non-limiting embodiments or aspects of a process for providing a virtual account of an individual based on biometric measurement.

Referring now to FIG. 3, FIG. 3 is a flowchart of non-limiting embodiments or aspects of a process 300 for providing a virtual account based on a biometric measurement. In non-limiting embodiments or aspects, one or more of the steps of process 300 may be performed (e.g., completely, partially, etc.) by transaction service provider system 102 (e.g., one or more devices of transaction service provider system 102). In non-limiting embodiments or aspects, one or more of the steps of process 300 may be performed (e.g., completely, partially, etc.) by another device or a group of devices separate from or including transaction service provider system 102, such as issuer system 104 (e.g., one or more devices of issuer system 104), user device 106-1, user device 106-2, merchant system 108 (e.g., one or more devices of merchant system 108), or document printing system 110 (e.g., one or more devices of document printing system 110).

As shown in FIG. 3, at step 302, process 300 includes receiving biometric data associated with a biometric measurement of an individual. For example, transaction service provider system 102 may receive biometric data associated with a biometric measurement of the individual (e.g., first biometric data associated with a first biometric measurement of the individual). In non-limiting embodiments or aspects, transaction service provider system 102 may receive the biometric data associated with the biometric measurement of the individual from user device 106-1 of a user (e.g., a user that is sponsoring a virtual account of the individual). For example, transaction service provider system 102 may receive the biometric data associated with the biometric measurement of the individual from user device 106-1 via a mobile application stored on user device 106-1. In non-limiting embodiments or aspects, the mobile application may be controlled and/or operated by transaction service provider system 102. In non-limiting embodiments or aspects, user device 106-1 may capture the biometric measurement of the individual. For example, user device 106-1 may capture the biometric measurement of the individual via an image capture device (e.g., a camera), a sound recording device, and/or a biometric reader associated with user device 106-1.

In non-limiting embodiments or aspects, the biometric data associated with the biometric measurement of the individual may include biometric data associated with a biometric parameter that may be used to determine an identity of the individual. For example, the biometric data associated with the biometric measurement may include data associated with an image of the individual or a portion of the body of the individual, such as data associated with an image of the face of the individual, data associated with an image of an iris of an eye of the individual, and/or the like. Additionally or alternatively, the biometric data associated with the biometric measurement may include data associated with a fingerprint of the individual, data associated with a voice of the individual, and/or the like. In non-limiting embodiments or aspects, transaction service provider system 102 may receive image data associated with an image of the individual, where the image of the individual may captured by an image capture device of user device 106-1 of the user.

In non-limiting embodiments or aspects, the biometric data associated with the biometric measurement of the individual may include hashed biometric data associated with the biometric measurement. For example, user device 106-1 may capture a biometric measurement that includes a biometric measurement of the individual. User device 106-1 (e.g., via a mobile application stored on user device 106-1) may use biometric data associated with the biometric measurement as an input to a hash algorithm to generate hashed biometric data associated with the biometric measurement. In such an example, the hashed biometric data associated with the biometric measurement may include an output of the hash algorithm into which the biometric data associated with the biometric measurement of the individual is provided as an input. In non-limiting embodiments or aspects, transaction service provider system 102 may generate the hashed biometric data associated with the biometric measurement via the hash algorithm. In non-limiting embodiments or aspects, the biometric data associated with the biometric measurement of the individual may include encrypted biometric data associated with the biometric measurement. In non-limiting embodiments or aspects, the encrypted biometric data associated with the biometric measurement comprises data that has been encrypted via a homomorphic encryption scheme.

In non-limiting embodiments or aspects, transaction service provider system 102 may receive the hashed biometric data associated with the biometric measurement and transaction service provider system 102 may store the hashed biometric data associated with the biometric measurement. For example, transaction service provider system 102 may receive the hashed biometric data and store the hashed biometric data with an account identifier of the virtual account of the individual.

In non-limiting embodiments or aspects, transaction service provider system 102 may receive account generation data associated with parameters for generating a virtual account. For example, transaction service provider system 102 may receive the account generation data based on receiving an account generation request message. In such an example, the account generation data may be included in the account generation request message. In non-limiting embodiments or aspects, the account generation data may include data associated with an amount of electronic funds for the virtual account (e.g., the virtual account that is to be assigned to the individual), data associated with an account (e.g., an account associated with a user that is sponsoring a virtual of the individual) from which electronic funds for the virtual account are to be transferred, data associated with a restriction on use of electronic funds in the virtual account, and/or data associated with an expiration time period of the virtual account. In non-limiting embodiments or aspects, a restriction on use of electronic funds in the virtual account may include a restriction on a merchant with which a payment transaction may be conducted involving the virtual account, a time period restriction during which a payment transaction may be conducted involving the virtual account, and/or a transaction amount restriction of a payment transaction that may be conducted involving the virtual account. In non-limiting embodiments or aspects, a restriction on a merchant with which a payment transaction may be conducted involving the virtual account may include a restriction on a merchant category code (MCC), a merchant identifier, and/or the like, of a payment transaction that may be conducted involving the virtual account. In non-limiting embodiments or aspects, a time period restriction during which a payment transaction may be conducted involving the virtual account may include a restriction to a time period of a day (e.g., a day time period, a night time period, a morning time period, and/or the like) during which a payment transaction may or may not be conducted involving the virtual account. In non-limiting embodiments or aspects, a transaction amount restriction of a payment transaction that may be conducted involving the virtual account may include a maximum transaction amount, minimum transaction amount, and/or a range of a transaction amount of a payment transaction that may be conducted involving the virtual account.

In non-limiting embodiments or aspects, transaction service provider system 102 may receive an account generation request message. For example, transaction service provider system 102 may receive the account generation request message from user device 106-1 via a mobile application stored on user device 106-1. In non-limiting embodiments or aspects, the account generation request message may include the biometric data associated with the biometric measurement of the individual from user device 106-1. Additionally or alternatively, the account generation request message may include the account generation data associated with parameters for generating a virtual account.

As further shown in FIG. 3, at step 304, process 300 includes generating a virtual account for the individual. For example, transaction service provider system 102 may generate the virtual account for the individual. In non-limiting embodiments or aspects, transaction service provider system 102 may generate the virtual account of the individual based on the biometric measurement. In non-limiting embodiments or aspects, transaction service provider system 102 may generate the virtual account based on receiving the biometric data associated with the biometric measurement of the individual. For example, transaction service provider system 102 may generate the virtual account after receiving the biometric data.

In non-limiting embodiments or aspects, the virtual account may include a virtual card account (e.g., a virtual credit card account, a virtual gift card account, and/or the like) issued by an issuer institution (e.g., an issuer institution associated with issuer system 104). In non-limiting embodiments or aspects, the virtual account of the individual may include a virtual prepaid account controlled and operated by a transaction service provider or an issuer institution.

In non-limiting embodiments or aspects, transaction service provider system 102 may generate the virtual account based on account generation data associated with parameters for generating a virtual account. For example, transaction service provider system 102 may generate the virtual account so that the virtual account is generated based on the parameters for generating the virtual account and includes the parameters. In non-limiting embodiments or aspects, transaction service provider system 102 may generate the virtual account based on receiving an account generation request message.

In non-limiting embodiments or aspects, transaction service provider system 102 may store the biometric data associated with the biometric measurement of the individual, hashed biometric data associated with the biometric measurement of the individual, and/or the biometric measurement of the individual as a biometric identification parameter of the individual. For example, transaction service provider system 102 may store the biometric data associated with the biometric measurement of the individual, hashed biometric data associated with the biometric measurement of the individual, and/or the biometric measurement of the individual in a data structure and the biometric data associated with the biometric measurement of the individual, the hashed biometric data associated with the biometric measurement of the individual, and/or the biometric measurement of the individual may be used to authenticate an identity of the individual.

In non-limiting embodiments or aspects, transaction service provider system 102 may assign the virtual account to the individual. For example, transaction service provider system 102 may assign the virtual account to the individual by storing an account identifier of the virtual account with a biometric identification parameter of the individual in a data structure (e.g., a data structure associated with transaction service provider system 102).

In non-limiting embodiments or aspects, transaction service provider system 102 may determine an amount of electronic funds for the virtual account. For example, transaction service provider system 102 may determine an amount of electronic funds for the virtual account based on data associated with an amount of electronic funds for the virtual account received from user device 106-1 of the user.

In non-limiting embodiments or aspects, transaction service provider system 102 may determine a restriction on use of electronic funds in the virtual account and/or an expiration time period of the virtual account. For example, transaction service provider system 102 may determine the restriction on use of the electronic funds in the virtual account based on data associated with the restriction on use of electronic funds in the virtual account or data associated with the expiration time period of the virtual account received from user device 106-1 of the user.

In non-limiting embodiments or aspects, transaction service provider system 102 may transfer an amount of electronic funds for the virtual account from an account of the user that sponsored the virtual account to the virtual account. For example, transaction service provider system 102 may transfer the amount of electronic funds for the virtual account from the account of the user based on generating the virtual account. In non-limiting embodiments or aspects, transaction service provider system 102 may store data associated with the restriction on use of electronic funds in the virtual account with an account identifier of the virtual account associated with the individual.

As further shown in FIG. 3, at step 306, process 300 includes provisioning access to the virtual account of the individual. For example, transaction service provider system 102 may provision access to the virtual account of the individual. In non-limiting embodiments or aspects, transaction service provider system 102 may provision access to the virtual account based on the biometric measurement of the individual. For example, transaction service provider system 102 may provision access to the virtual account so that a biometric measurement of the individual may be used to access the virtual account. In non-limiting embodiments or aspects, transaction service provider system 102 may provision access to the virtual account so that a biometric measurement of the individual, taken in real-time, may be determined to correspond to (e.g., match, partially match, and/or the like) a biometric identification parameter of the individual that is stored (e.g., stored in a data structure associated with transaction service provider system 102) before access to the virtual account is granted. Additionally or alternatively, transaction service provider system 102 may provision access to the virtual account of the individual based on data associated with the user that sponsored the virtual account. For example, transaction service provider system 102 may provision access to the virtual account based on a password of the user, an account identifier of the account of the user, and/or the like. In such an example, the user may access the virtual account, via user device 106-1 (e.g., via a mobile application stored on user device 106-1), to transfer electronic funds to the virtual account, transfer electronic funds from the virtual account, communicate information to the individual associated with the virtual account, and/or the like.

In non-limiting embodiments or aspects, transaction service provider system 102 may transfer an amount of electronic funds for the virtual account based on provisioning the virtual account. For example, transaction service provider system 102 may transfer the amount of electronic funds for the virtual account from an account of the user that sponsored the virtual account to the virtual account based on provisioning the virtual account.

In non-limiting embodiments or aspects, transaction service provider system 102 may transfer an amount of electronic funds in the virtual account (e.g., an amount of electronic funds remaining in the virtual account) to an account (e.g., an account associated with a user that sponsored the virtual account of the individual) from which electronic funds for the virtual account were transferred when the virtual account was generated. For example, transaction service provider system 102 may transfer the amount of electronic funds in the virtual account of the individual from the virtual account to the account associated with the user that sponsored the virtual account based on an expiration of an expiration time period of the virtual account. In non-limiting embodiments or aspects, transaction service provider system 102 may transfer the amount of electronic funds in the virtual account based on determining that the expiration time period of the virtual account has passed. For example, transaction service provider system 102 may determine a time at which the virtual account was generated and transaction service provider system 102 may initiate a time counter at the time at which the virtual account was generated. The time counter may be equal to the expiration time period of the virtual account. If transaction service provider system 102 determines that the time counter has expired, transaction service provider system 102 may transfer the amount of electronic funds in the virtual account to the account associated with the user that sponsored the virtual account.

As further shown in FIG. 3, at step 308, process 300 includes sending a message that includes an indication associated with the virtual account. For example, transaction service provider system 102 may send the message (e.g., the notification message) that includes the indication associated with the virtual account. In non-limiting embodiments or aspects, transaction service provider system 102 may send the message to user device 106-1 from which the biometric data associated with the biometric measurement of the individual used to generate the virtual account was received. In non-limiting embodiments or aspects, transaction service provider system 102 may send the message to a user device of the individual. In non-limiting embodiments or aspects, transaction service provider system 102 may send the message via a mobile application stored on a user device (e.g., user device 106-1 of the user, user device 106-2 of the individual, and/or the like).

In non-limiting embodiments or aspects, the message may include an indication that the virtual account was generated and/or that the virtual account was provisioned for access (e.g., provisioned for access by the individual based on a biometric measurement of the individual). In non-limiting embodiments or aspects, the message may include account generation data associated with parameters for generating the virtual account. For example, the message may include data associated with an amount of electronic funds for the virtual account, data associated with a restriction on use of electronic funds in the virtual account, and/or data associated with a time expiration of the virtual account.

In non-limiting embodiments or aspects, transaction service provider system 102 may send a message that includes data associated with a payment transaction conducted involving the virtual account. For example, transaction service provider system 102 may send the message to user device 106-1 and/or user device 106-2 and the message may include transaction data associated with a payment transaction conducted involving the virtual account. In non-limiting embodiments or aspects, transaction service provider system 102 may send a message that includes data associated an amount of electronic funds of the virtual account. For example, transaction service provider system 102 may send a message that includes data associated an amount of electronic funds of the virtual account to user device 106-1 of the user that sponsored the virtual account and/or user device 106-2 of the individual (e.g., the individual associated with the virtual account). In non-limiting embodiments or aspects, transaction service provider system 102 may send a message that includes an indication that an amount of electronic funds of the virtual account are exhausted. For example, transaction service provider system 102 may send a message to user device 106-1 and/or user device 106-2 that includes the indication that the amount of electronic funds of the virtual account are exhausted and/or a date upon which the amount of electronic funds were exhausted.

In non-limiting embodiments or aspects, transaction service provider system 102 may send data associated with the virtual account to document printing system 110. For example, transaction service provider system 102 may send data associated with the virtual account to document printing system 110 based on receiving a request to access the virtual account from document printing system 110 and/or a user device of the individual associated with the virtual account. In non-limiting embodiments or aspects, transaction service provider system 102 may cause a document to be generated (e.g., generated by document printing system 110). For example, transaction service provider system 102 may cause a document to be generated based on authenticating the identity of the individual via the biometric data associated with the biometric measurement of the individual.

In non-limiting embodiments or aspects, document printing system 110 may print a document that includes an account identifier of the virtual account. For example, document printing system 110 may generate (e.g., print) a payment device that includes an account identifier of the virtual account and the payment device may be configured to be used to conduct a payment transaction involving the virtual account.

Figure 4:
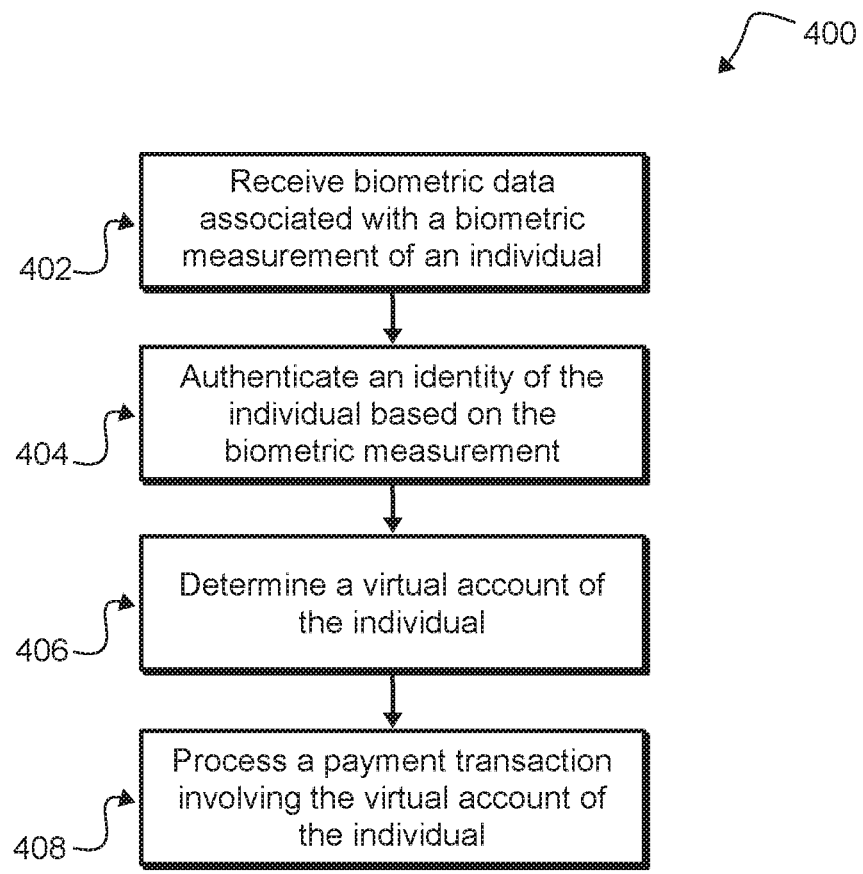
FIG. 4 is a flowchart of non-limiting embodiments or aspects of a process for accessing a virtual account of an individual based on biometric measurement.

Referring now to FIG. 4, FIG. 4 is a flowchart of non-limiting embodiments or aspects of a process 400 for accessing a virtual account based on a biometric measurement. In non-limiting embodiments or aspects, one or more of the steps of process 400 may be performed (e.g., completely, partially, etc.) by transaction service provider system 102 (e.g., one or more devices of transaction service provider system 102). In non-limiting embodiments or aspects, one or more of the steps of process 300 may be performed (e.g., completely, partially, etc.) by another device or a group of devices separate from or including transaction service provider system 102, such as issuer system 104 (e.g., one or more devices of issuer system 104), user device 106-1, user device 106-2, merchant system 108 (e.g., one or more devices of merchant system 108), or document printing system 110 (e.g., one or more devices of document printing system 110). In non-limiting embodiments or aspects, the process 400 for accessing a virtual account of an individual based on a biometric measurement may be performed in conjunction with or independent of the process 300 for providing a virtual account of an individual based on a biometric measurement.

As shown in FIG. 4, at step 402, process 400 includes receiving biometric data associated with a biometric measurement of an individual. For example, transaction service provider system 102 may receive biometric data associated with a biometric measurement of an individual (e.g., second biometric data associated with a second biometric measurement of the individual). In non-limiting embodiments or aspects, step 402 may be the same or similar as step 302 described above. In non-limiting embodiments or aspects, merchant system 108 may capture the biometric measurement of the individual. For example, a POS device of merchant system 108 may capture the biometric measurement of the individual via an image capture device (e.g., a camera), a sound recording device, and/or a biometric reader associated with the POS device. In non-limiting embodiments or aspects, transaction service provider system 102 may receive image data associated with an image of the individual, where the image of the individual may captured by an image capture device of merchant system 108.

In non-limiting embodiments or aspects, merchant system 108 may send the biometric data associated with the biometric measurement of the individual to transaction service provider system 102. For example, merchant system 108 may send the biometric data associated with the biometric measurement of the individual to transaction service provider system 102 via a mobile application (e.g., a mobile application on a POS device associated with merchant system 108) associated with the virtual account. In non-limiting embodiments or aspects, the biometric data may be included in an authorization request message for a payment transaction sent by merchant system 108 to transaction service provider system 102.

In non-limiting embodiments or aspects, merchant system 108 may send hashed biometric data associated with the biometric measurement of the individual to transaction service provider system 102. For example, merchant system 108 may capture a biometric measurement that includes a biometric measurement of the individual. Merchant system 108 (e.g., via a mobile application stored on a POS device of merchant system 108) may use the biometric data associated with the biometric measurement as an input to a hash algorithm. In such an example, the hashed biometric data associated with the biometric measurement may include an output of the hash algorithm into which the biometric data associated with the biometric measurement of the individual is provided as an input. In non-limiting embodiments or aspects, the hash algorithm may be the same hash algorithm used by user device 106-1 to provide hashed biometric data associated with a biometric measurement of the individual.

In non-limiting embodiments or aspects, transaction service provider system 102 may receive account data associated with the virtual account. For example, transaction service provider system 102 may receive the data associated with the virtual account based on receiving a message (e.g., an authorization request message for a payment transaction involving the virtual account). In such an example, the data associated with the virtual account may be included in the message. In non-limiting embodiments or aspects, the account data may include data associated with an account identifier of the virtual account, data associated with an amount of electronic funds of the virtual account (e.g., an amount of electronic funds included in the virtual account at a specified time interval), data associated with a restriction on use of electronic funds in the virtual account, and/or data associated with an expiration time period of the virtual account.

In non-limiting embodiments or aspects, transaction service provider system 102 may receive an authorization request message for a payment transaction involving the virtual account. For example, transaction service provider system 102 may receive the authorization request message from merchant system 108 (e.g., via a mobile application stored on merchant system 108, via a mobile application stored on a POS device of merchant system 108, and/or the like) based on a payment transaction between a merchant associated with merchant system 108 and the individual associated with user device 106-2 involving the virtual account. In non-limiting embodiments or aspects, the authorization request message may include the biometric data associated with the biometric measurement of the individual from user device 106-1. Additionally or alternatively, the authorization request message may include the data associated with the virtual account.

As further shown in FIG. 4, at step 404, process 400 includes authenticating an identity of the individual based on the biometric measurement. For example, transaction service provider system 102 may authenticate the identity of the individual based on the biometric measurement. In non-limiting embodiments or aspects, transaction service provider system 102 may determine the biometric measurement of the individual based on the biometric data associated with the biometric measurement of the individual. For example, transaction service provider system 102 may determine the biometric measurement of the individual based on the biometric data associated with the biometric measurement of the individual received from merchant system 108.

In non-limiting embodiments or aspects, transaction service provider system 102 may determine whether to authenticate the identity of the individual based on the biometric measurement. For example, transaction service provider system 102 may compare the biometric measurement of the individual to a biometric identification parameter of the individual. Transaction service provider system 102 may determine whether the biometric measurement of the individual corresponds to a biometric identification parameter of the individual. If transaction service provider system 102 determines that the biometric measurement of the individual corresponds to the biometric identification parameter of the individual, transaction service provider system 102 may authenticate the identity of the individual. If transaction service provider system 102 determines that the biometric measurement of the individual does not correspond to the biometric identification parameter of the individual, transaction service provider system 102 may forego authenticating the identity of the individual.

In non-limiting embodiments or aspects, transaction service provider system 102 may authenticate the identity of the individual based on homomorphic encryption. As used herein, the term "homomorphic encryption" is intended to refer to a form of encryption that allows computational operations on ciphertext. In non-limiting embodiments or aspects, such a computational operation may include generating an encrypted result by performing computational operations on encrypted information (e.g., ciphertext) so that when the encrypted result of the computational operations is decrypted, the decrypted result matches a result of the computational operations as if the computational operations had been performed on plaintext associated with ciphertext (e.g., the plaintext that was used to produce the ciphertext). Thus, the biometric measurement of the individual may be used to generate an encrypted result, that when decrypted, matches the result of operations as if the operations had been performed on an unencrypted biometric measurement of the individual. Accordingly, encrypted results may be passed between devices and/or software applications (e.g., mobile applications) being run on one or more devices and a device that receives the encrypted results may decrypt the encrypted results and use the encrypted results and/or decrypted results for authenticating an identity of the individual as described herein. Examples of homomorphic encryption are disclosed in International Patent Application No. PCT/US2016/058880, filed on Oct. 26, 2016, and International Patent Application No. PCT/US2017/024099, filed on Mar. 24, 2017, each of which is incorporated by reference herein.

In non-limiting embodiments or aspects, transaction service provider system 102 may authentic the identity of the individual based on receiving the biometric data associated with the biometric measurement of the individual. For example, transaction service provider system 102 may receive the biometric data associated with the biometric measurement of the individual and transaction service provider system 102 may determine whether the biometric measurement of the individual (e.g., the biometric measurement determine from the biometric data received from merchant system 108) corresponds to a biometric identification parameter of the individual that is stored with an account identifier of the virtual account. In non-limiting embodiments or aspects, transaction service provider system 102 may determine whether the biometric measurement of the individual corresponds to a biometric identification parameter of the individual that is stored with an account identifier of the virtual account. If transaction service provider system 102 determines that the biometric measurement of the individual corresponds to the biometric identification parameter of the individual that is stored with the account identifier of the virtual account, transaction service provider system 102 may authentic the identity of the individual. If transaction service provider system 102 determines that the biometric measurement of the individual does not correspond to the biometric identification parameter of the individual that is stored with the account identifier of the virtual account, transaction service provider system 102 may forego authenticating an identity of the individual.

As further shown in FIG. 4, at step 406, process 400 includes determining a virtual account of the individual. For example, transaction service provider system 102 may determine the virtual account of the individual based on authenticating the identity of the individual. In non-limiting embodiments or aspects, transaction service provider system 102 may determine an account identifier of the virtual account of the individual. For example, transaction service provider system 102 may determine the account identifier of the virtual account of the individual based on data associated with the virtual account included in an authorization request message for a payment transaction.

In non-limiting embodiments or aspects, transaction service provider system 102 may determine that the biometric measurement of the individual (e.g., the biometric measurement determine from the biometric data received from merchant system 108) corresponds to a biometric identification parameter of the individual that is stored with an account identifier of the virtual account. Transaction service provider system 102 may retrieve the account identifier of the virtual account based on determining that the biometric measurement of the individual corresponds to the biometric identification parameter of the individual that is stored with the account identifier of the virtual account.

In non-limiting embodiments or aspects, transaction service provider system 102 may send data associated with the virtual account of the individual based on determining the virtual account of the individual. For example, transaction service provider system 102 may send the data associated with the virtual account of the individual to user device 106-1 and/or user device 160-2 based on determining the virtual account of the individual. In non-limiting embodiments or aspects, transaction service provider system 102 may send account identifier data associated with an account identifier of the virtual account of the individual.

As further shown in FIG. 4, at step 408, process 400 includes processing a payment transaction involving the virtual account of the individual. For example, transaction service provider system 102 may process the payment transaction involving the virtual account of the individual. In non-limiting embodiments or aspects, transaction service provider system 102 may process the payment transaction involving the virtual account of the individual based on determining an account identifier of the virtual account of the individual. For example, transaction service provider system 102 may determine the account identifier of the virtual account of the individual based on data associated with the virtual account included in an authorization request message for the payment transaction. Transaction service provider system 102 may process the payment transaction based on the account identifier of the virtual account of the individual.

In non-limiting embodiments or aspects, if transaction service provider system 102 determines that the biometric measurement of the individual received from merchant system 108 corresponds to the biometric identification parameter of the individual that is stored with the account identifier of the virtual account, transaction service provider system 102 may send an indication that a payment transaction involving the virtual account is authorized. In non-limiting embodiments or aspects, if transaction service provider system 102 determines that the biometric measurement of the individual received from merchant system 108 does not correspond to the biometric identification parameter of the individual that is stored with the account identifier of the virtual account, transaction service provider system 102 may send an indication that the payment transaction involving the virtual account is not authorized.

In non-limiting embodiments or aspects, transaction service provider system 102 may or may not process a payment transaction involving the virtual account based on a restriction on use of electronic funds in the virtual account and/or an expiration time period of the virtual account. For example, transaction service provider system 102 may process the payment transaction involving the virtual account based on determining that the payment transaction complies with a restriction on use of electronic funds in the virtual account and/or an expiration time period of the virtual account. In another example, transaction service provider system 102 may not process the payment transaction involving the virtual account based on determining that the payment transaction does not comply with a restriction on use of electronic funds in the virtual account and/or an expiration time period of the virtual account.

FIGS. 5A-5D are diagrams of an overview of non-limiting embodiments or aspects of an implementation 500 relating to processes 300 and 400 shown in FIGS. 3 and 4. As shown in FIGS. 5A-5D, implementation 500 may include a transaction service provider system 502, mobile device 506-1, mobile device 506-2, and point-of-sale (POS) device 508. In non-limiting embodiments or aspects, transaction service provider system 502 may be the same or similar to transaction service provider system 102, mobile device 506-1 may be the same or similar to user device 106-1, mobile device 506-2 may be the same or similar to user device 106-2, and POS device 508 may be the same or similar to merchant system 108.

Figure 5A:
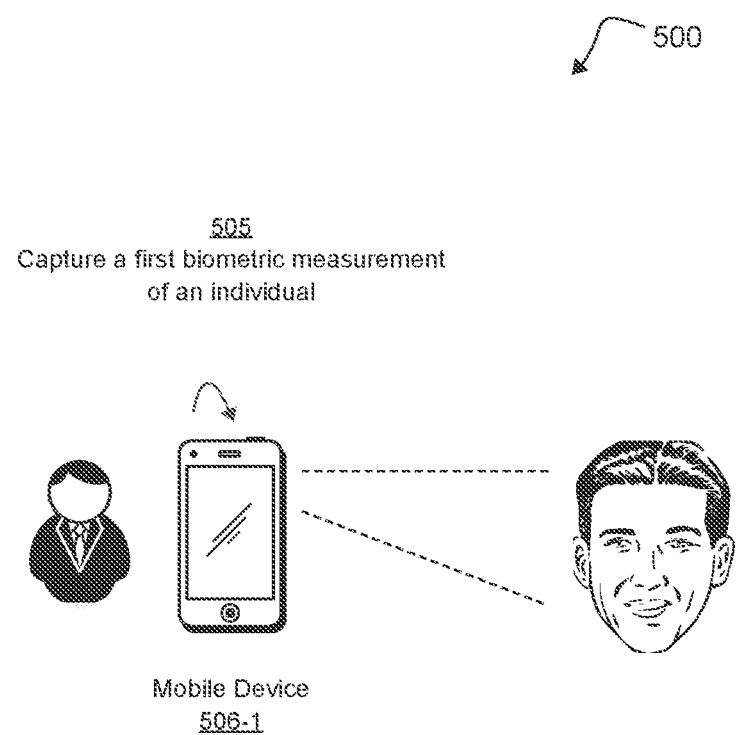
FIGS. 5A-5E are diagrams of an implementation of non-limiting embodiments or aspects of a process disclosed herein.

As shown by reference number 505 in FIG. 5A, mobile device 506-1 of a user may capture a first biometric measurement of an individual. For example, mobile device 506-1 may capture the biometric measurement of the individual via an image capture device (e.g., a camera) of mobile device 506-1.

Figure 5B:
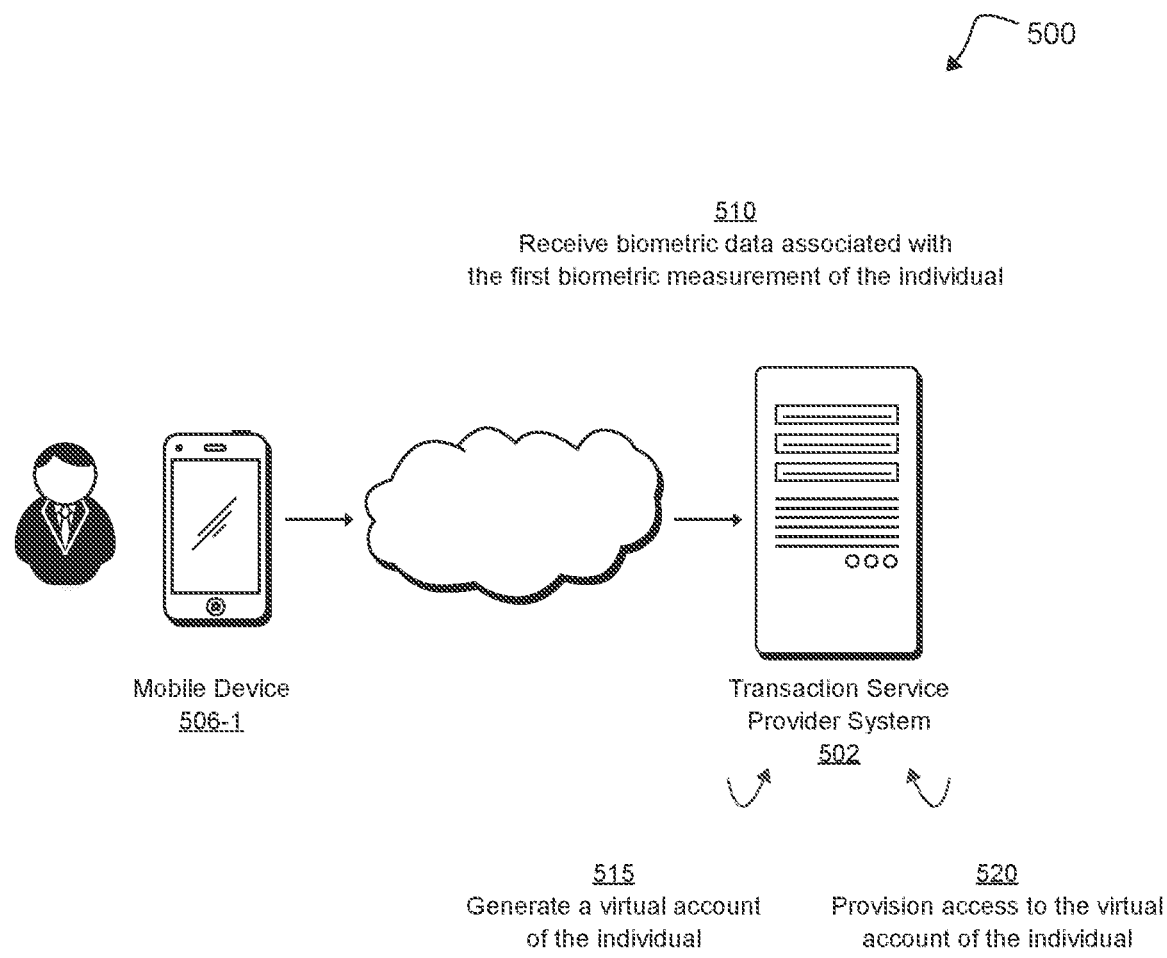

As shown by reference number 510 in FIG. 5B, transaction service provider system 502 may receive biometric data associated with the first biometric measurement of the individual from mobile device 506-1. For example, transaction service provider system 502 may receive the biometric data associated with the first biometric measurement of the individual from mobile device 506-1 of the user that is sponsoring a virtual account of the individual. In non-limiting embodiments or aspects, transaction service provider system 502 may receive the biometric data associated with the first biometric measurement of the individual from mobile device 506-1 via a mobile application stored on mobile device 506-1.

As further shown by reference number 515 in FIG. 5B, transaction service provider system 502 may generate a virtual account of the individual. For example, transaction service provider system 502 may generate the virtual account of the individual based on receiving the biometric data associated with the first biometric measurement of the individual. In non-limiting embodiments or aspects, transaction service provider system 502 may store the biometric data associated with the first biometric measurement of the individual as a biometric identification parameter of the individual.

As further shown by reference number 520 in FIG. 5B, transaction service provider system 502 may provision access to the virtual account of the individual. For example, transaction service provider system 502 may provision access to the virtual account based on a biometric measurement of the individual. For example, transaction service provider system 102 may provision access to the virtual account so that a biometric measurement of the individual may be used to access the virtual account.

Figure 5C:
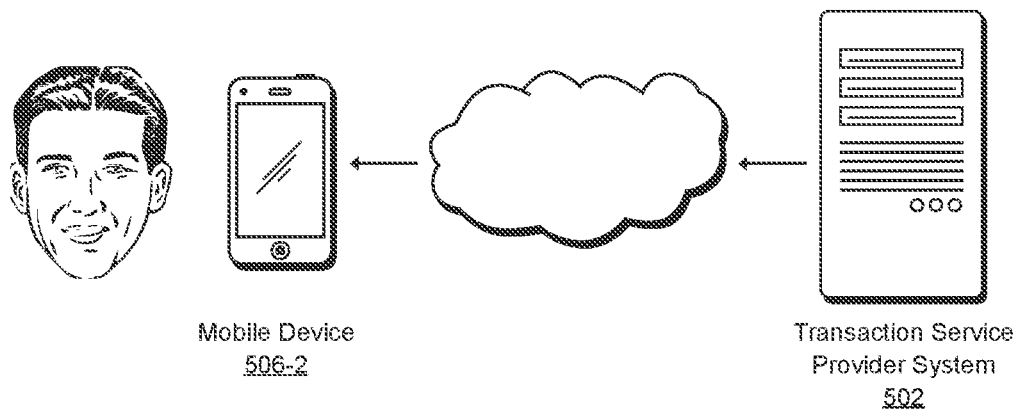

As shown by reference number 525 in FIG. 5C, transaction service provider system 502 may send a message to mobile device 506-2 of the individual. The message may include an indication associated with the virtual account. For example, transaction service provider system 102 may send the message that includes an indication that the virtual account was generated and/or that the virtual account was provisioned for access (e.g., provisioned for access by the individual based on a biometric measurement of the individual). In non-limiting embodiments or aspects, the message may include account generation data associated with parameters for generating the virtual account.

Figure 5D:
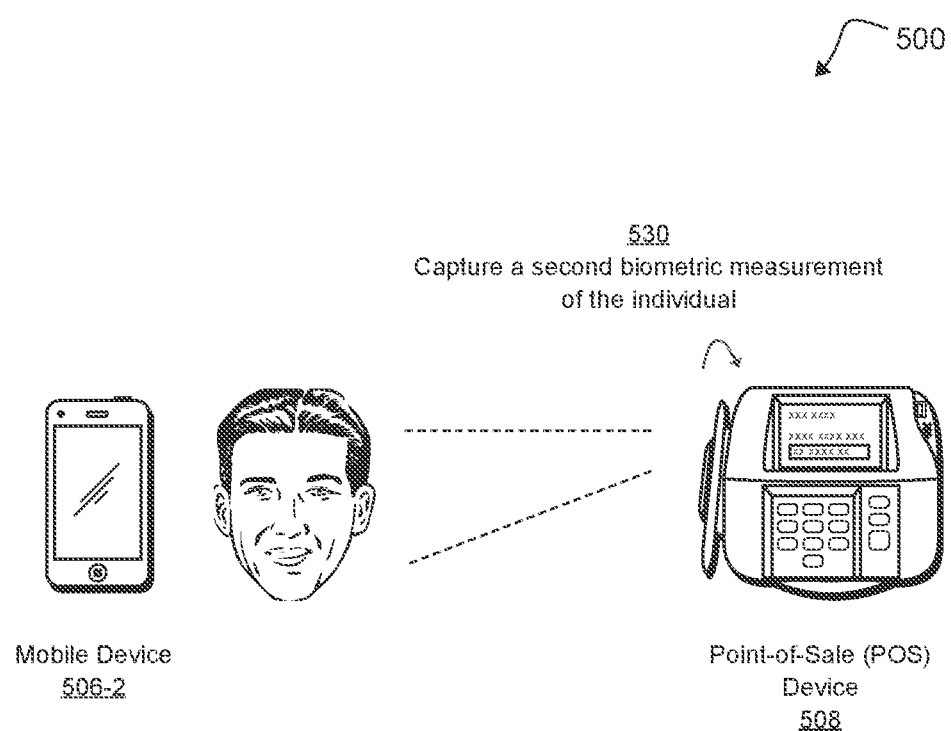

As shown by reference number 530 in FIG. 5D, POS device 508 may capture a second biometric measurement of the individual. For example, POS device 508 may capture the biometric measurement of the individual via an image capture device (e.g., a camera) of POS device 508.

Figure 5E:
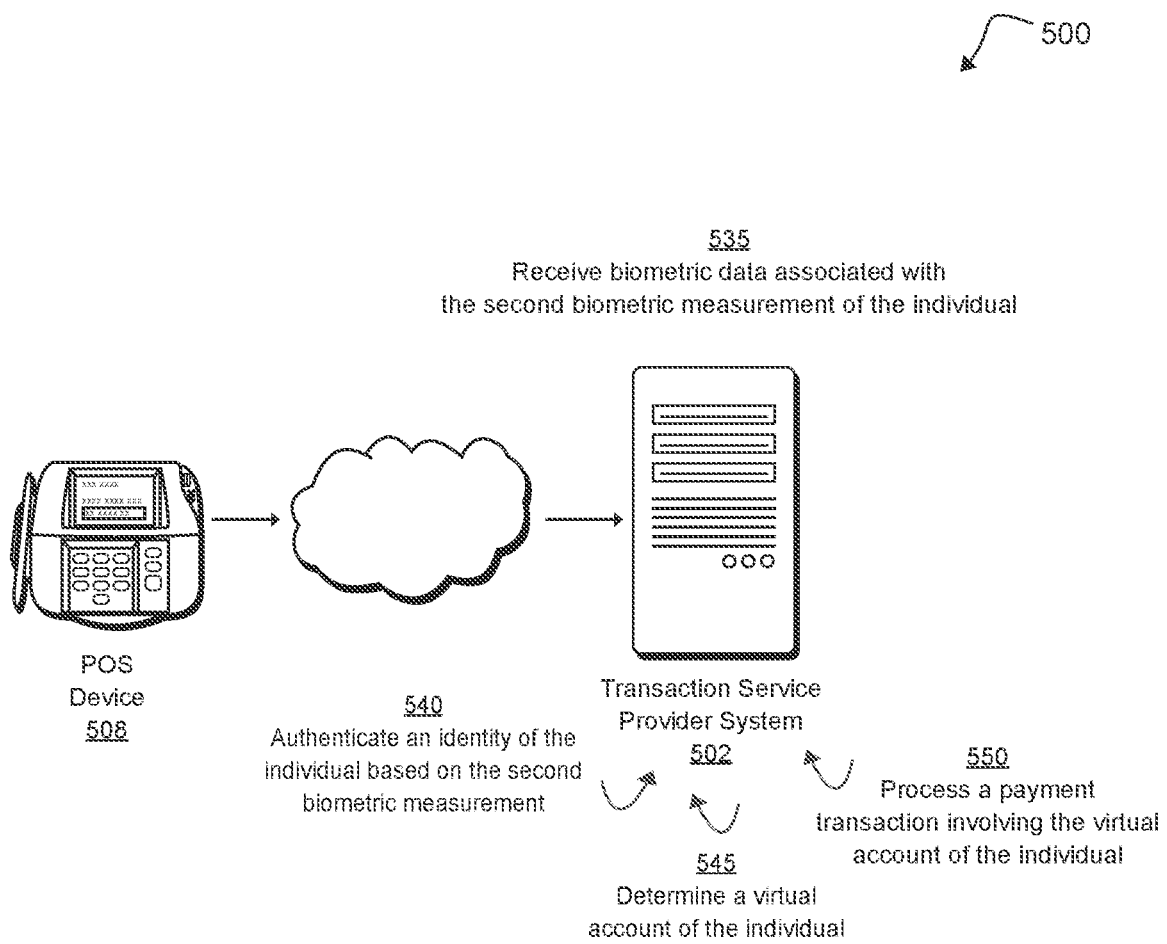

As further shown by reference number 535 in FIG. 5E, transaction service provider system 502 may receive biometric data associated with the second biometric measurement of the individual from POS device 508. For example, transaction service provider system 502 may receive the biometric data associated with the second biometric measurement of the individual during a payment transaction between a merchant associated with POS device 508 and the individual associated with mobile device 506-2. In non-limiting embodiments or aspects, transaction service provider system 502 may receive the biometric data associated with the first biometric measurement of the individual from POS device 508 via a mobile application stored on POS device 508.

As further shown by reference number 540 in FIG. 5E, transaction service provider system 502 may authenticate an identity of the individual based on the second biometric measurement. For example, transaction service provider system 502 may determine to authenticate the identity of the individual based on the second biometric measurement. In such an example, transaction service provider system 502 may compare the second biometric measurement of the individual to a biometric identification parameter of the individual. Transaction service provider system 102 may determine that the second biometric measurement of the individual corresponds to the biometric identification parameter of the individual and transaction service provider system 502 may authenticate the identity of the individual.

As further shown by reference number 545 in FIG. 5E, transaction service provider system 502 may determine a virtual account of the individual. For example, transaction service provider system 502 may determine the virtual account of the individual based on authenticating the identity of the individual. In non-limiting embodiments or aspects, transaction service provider system 502 may determine an account identifier of the virtual account of the individual. For example, transaction service provider system 502 may determine the account identifier of the virtual account of the individual based on data associated with the virtual account included in an authorization request message for a payment transaction.

As shown by reference number 550 in FIG. 5E, transaction service provider system 502 may process a payment transaction involving the virtual account of the individual. For example, transaction service provider system 502 may process the payment transaction involving the virtual account of the individual based on determining an account identifier of the virtual account of the individual.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for providing a virtual account based on a biometric measurement, the computer-implemented method comprising:

receiving, with at least one processor of a transaction service provider system, an account generation request message, wherein the account generation request message comprises account generation data associated with parameters for generating a virtual account and biometric data associated with a biometric measurement of an individual, wherein the biometric data associated with the biometric measurement of the individual comprises image data associated with an image of the individual, and wherein receiving the biometric data associated with the biometric measurement of the individual comprises:
  receiving the image data associated with the image of the individual, wherein the image of the individual is captured by an image capture device associated with a user device of a user that sponsors the virtual account of the individual;

generating, with at least one processor of the transaction service provider system, the virtual account of the individual based on receiving the biometric data associated with the biometric measurement of the individual, wherein the virtual account comprises a virtual prepaid account operated by the transaction service provider system, and wherein generating the virtual account of the individual comprises:
  determining an amount of electronic funds for the virtual account based on the account generation data received from the user device;
  determining a restriction on use of electronic funds in the virtual account and an expiration time period of the virtual account based on the account generation data received from the user device;
  storing the restriction on use of electronic funds in the virtual account with an account identifier of the virtual account of the individual;

provisioning, with at least one processor of the transaction service provider system, access to the virtual account of the individual based on the biometric measurement of the individual;

authenticating, with at least one processor of the transaction service provider system, an identity of the individual based on the biometric data associated with the biometric measurement of the individual;

transferring, with at least one processor of the transaction service provider system, the amount of electronic funds from an account of the user that sponsors the virtual account of the individual based on authenticating an identity of the individual;

causing, with at least one processor of the transaction service provider system, a physical document to be generated by a document printing system based on authenticating an identity of the individual, wherein the physical document comprises a payment device that includes an account identifier of the virtual account, and wherein causing the physical document to be generated by the document printing system comprises:
  sending data associated with the virtual account to the document printing system based on receiving a request to access the virtual account, wherein the request to access the virtual account comprises the biometric measurement of the individual;

sending, with at least one processor of the transaction service provider system, a notification message to the user device based on generating the virtual account associated with the individual, wherein the notification message includes an indication that the virtual account of the individual has been generated;

processing, with at least one processor of the transaction service provider system, a payment transaction conducted involving the virtual account;

sending, with at least one processor of the transaction service provider system, a notification message to the user device of the user, wherein the notification message includes data associated with the payment transaction conducted involving the virtual account; and transferring, with at least one processor of the transaction service provider system, the amount of electronic funds remaining in the virtual account to the account of the user that sponsored the virtual account of the individual based on an expiration of the expiration time period after generating the virtual account of the individual.

2. The computer-implemented method of claim 1, wherein the notification message is a first notification message, the user device is a first user device of a user, and the method further comprising:
   sending a second notification message to a second user device of the individual based on generating the account associated with the individual, wherein the second notification message includes an indication that the account of the individual has been generated and data associated with an amount of electronic funds for the virtual account of the individual.

3. The computer-implemented method of claim 1, wherein the biometric data associated with the biometric measurement of the individual comprises hashed biometric data associated with the biometric measurement, wherein the hashed biometric data associated with the biometric measurement comprises an output of a hash algorithm into which biometric data associated with the individual captured by the user device is inputted, and wherein receiving the biometric data associated with the biometric measurement of the individual comprises:
   receiving the hashed biometric data associated with the biometric measurement; and
   wherein generating the virtual account of the individual comprises:
      storing the hashed biometric data associated with the biometric measurement with an account identifier of the virtual account of the individual.

4. The computer-implemented method of claim 1, wherein the biometric measurement is a first biometric measurement, the method further comprising:
   receiving biometric data associated with a second biometric measurement of the individual;
   authenticating an identity of the individual based on the biometric data associated with the second biometric measurement of the individual;
   determining data associated with the virtual account of the individual based on authenticating the identity of the individual; and
   sending the data associated with the virtual account of the individual.

5. The computer-implemented method of claim 4, wherein authenticating the identity of the individual comprises:
   comparing the second biometric measurement of the individual with a biometric identification parameter of the individual;
   determining whether the second biometric measurement of the individual corresponds to the biometric identification parameter of the individual; and
   authenticating the identity of the individual based on determining that the second biometric measurement of the individual corresponds to the biometric identification parameter of the individual.

6. The computer-implemented method of claim 1, further comprising:
   initiating a time counter at a time at which the virtual account was generated, wherein the time counter is equal to the expiration time period of the virtual account.

7. The computer-implemented method of claim 1, wherein the restriction on use of the electronic funds in the virtual account comprises at least one of the following:
   a minimum transaction amount;
   a range of a transaction amount of a payment transaction that may be conducted involving the virtual account; or
   any combination thereof.

8. A system for providing a virtual account based on a biometric measurement, the system comprising:
   at least one processor of a transaction service provider system programmed or configured to:
      receive an account generation request message, wherein the account generation request message comprises account generation data associated with parameters for generating a virtual account and biometric data associated with a biometric measurement of an individual from a user device of a user, wherein the biometric data associated with the biometric measurement of the individual comprises image data associated with an image of the individual, and wherein, when receiving the biometric data associated with the biometric measurement of the individual, the at least one processor of the transaction service provider system is programmed or configured to:
         receive the image data associated with the image of the individual, wherein the image of the individual is captured by an image capture device associated with the user device of the user;
      generate the virtual account of the individual based on receiving the biometric data associated with the biometric measurement of the individual, wherein the virtual account comprises a virtual prepaid account operated by the transaction service provider system, and wherein, when generating the virtual account of the individual, the at least one processor is programmed or configured to:
         determine an amount of electronic funds for the virtual account based on the account generation data received from the user device;
         determine a restriction on use of electronic funds in the virtual account and an expiration time period of the virtual account based on the account generation data received from the user device;
         store the restriction on use of electronic funds in the virtual account with an account identifier of the virtual account of the individual;
      provision access to the virtual account of the individual based on the biometric measurement of the individual;
      authenticate an identity of the individual based on the biometric data associated with the biometric measurement of the individual;
      transfer the amount of electronic funds from an account of the user based on authenticating an identity of the individual;
      cause a physical document to be generated by a document printing system based on authenticating an identity of the individual, wherein the physical document comprises a payment device that includes an account identifier of the virtual account, and wherein, when causing the physical document to be generated by the document printing system, the at least one processor is programed or configured to:
         send data associated with the virtual account to the document printing system based on receiving a request to access the virtual account, wherein the request to access the virtual account comprises the biometric measurement of the individual;
      send a message to the user device based on generating the virtual account associated with the individual, wherein the message includes an indication associated with the virtual account of the individual;

process a payment transaction conducted involving the virtual account;

send a notification message to the user device of the user, wherein the notification message includes data associated with the payment transaction conducted involving the virtual account; and transfer the amount of electronic funds remaining in the virtual account to the account of the user that sponsored the virtual account of the individual based on an expiration of the expiration time period after generating the virtual account of the individual.

9. The system of claim 8, wherein the message is a first message, the user device of the user is a first user device of the user, and the at least one processor of the transaction service provider system is further programmed or configured to:

send a second message to a second user device of the individual based on generating the account associated with the individual, wherein the second message includes an indication that the account of the individual has been generated and data associated with an amount of electronic funds for the virtual account of the individual.

10. The system of claim 8, wherein the biometric measurement is a first biometric measurement, and the at least one processor of the transaction service provider system is further programmed or configured to:

receive biometric data associated with a second biometric measurement of the individual;

authenticate an identity of the individual based on the biometric data associated with the second biometric measurement of the individual;

determine data associated with the virtual account of the individual based on authenticating the identity of the individual; and send the data associated with the virtual account of the individual.

11. The system of claim 8, where the at least one processor is further programmed or configured to:

initiate a time counter at a time at which the virtual account was generated, wherein the time counter is equal to the expiration time period of the virtual account.

12. The system of claim 8, wherein the restriction on use of the electronic funds in the virtual account comprises at least one of the following:

a minimum transaction amount;

a range of a transaction amount of a payment transaction that may be conducted involving the virtual account; or any combination thereof.

13. A computer program product for providing a virtual account based on a biometric measurement, the computer program product comprising at least one non-transitory computer-readable medium including one or more instructions that, when executed by at least one processor of a transaction service provider system, cause the at least one processor of the transaction service provider system to:

receive an account generation request message, wherein the account generation request message comprises account generation data associated with parameters for generating a virtual account and biometric data associated with a biometric measurement of an individual, wherein the biometric data associated with the biometric measurement of the individual comprises image data associated with an image of the individual, and wherein, the one or more instructions that cause the at least one processor of the transaction service provider system to receive the biometric data associated with the biometric measurement of the individual, cause the at least one processor of the transaction service provider system to:

receive the image data associated with the image of the individual, wherein the image of the individual is captured by an image capture device associated with a user device of a user that sponsors the virtual account of the individual;

generate the virtual account of the individual based on receiving the biometric data associated with the biometric measurement of the individual, wherein the virtual account comprises a virtual prepaid account operated by the transaction service provider system, and wherein, the one or more instructions that cause the at least one processor to generate the virtual account of the individual, cause the at least one processor to:

determine an amount of electronic funds for the virtual account based on the account generation data received from the user device;

determine a restriction on use of electronic funds in the virtual account and an expiration time period of the virtual account based on the account generation data received from the user device;

store the restriction on use of electronic funds in the virtual account with an account identifier of the virtual account of the individual;

provision access to the virtual account of the individual based on the biometric measurement of the individual;

authenticate an identity of the individual based on the biometric data associated with the biometric measurement of the individual;

cause a physical document to be generated by a document printing system based on authenticating an identity of the individual, wherein the physical document comprises a payment device that includes an account identifier of the virtual account, wherein, when causing the physical document to be generated by the document printing system, the at least one processor is programed or configured to:

send data associated with the virtual account to document printing system based on receiving a request to access the virtual account, wherein the request to access the virtual account comprises the biometric measurement of the individual;

transfer the amount of electronic funds from an account of the user that sponsors the virtual account of the individual based on authenticating an identity of the individual;

send a message to the user device based on generating the virtual account associated with the individual, wherein the message includes an indication associated with the virtual account of the individual;

process a payment transaction conducted involving the virtual account;

send a notification message to the user device of the user, wherein the notification message includes data associated with the payment transaction conducted involving the virtual account; and transfer the amount of electronic funds remaining in the virtual account to the account of the user that sponsored the virtual account of the individual based on an expiration of the expiration time period after generating the virtual account of the individual.

14. The computer program product of claim 13, wherein the biometric measurement is a first biometric measurement, and wherein the one or more instructions further cause the at least one processor of the transaction service provider system to:
- receive biometric data associated with a second biometric measurement of the individual;
- authenticate an identity of the individual based on the biometric data associated with the second biometric measurement of the individual;
- determine data associated with the virtual account of the individual based on authenticating the identity of the individual; and
- send the data associated with the account assigned to the individual.

15. The computer program product of claim 13, wherein the one or more instructions further cause the at least one processor to:
- initiate a time counter at a time at which the virtual account was generated, wherein the time counter is equal to the expiration time period of the virtual account.

16. The computer program product of claim 13, wherein the restriction on use of the electronic funds in the virtual account comprises at least one of the following:
- a minimum transaction amount;
- a range of a transaction amount of a payment transaction that may be conducted involving the virtual account; or
- any combination thereof.

* * * * *